Mar. 6, 1923.

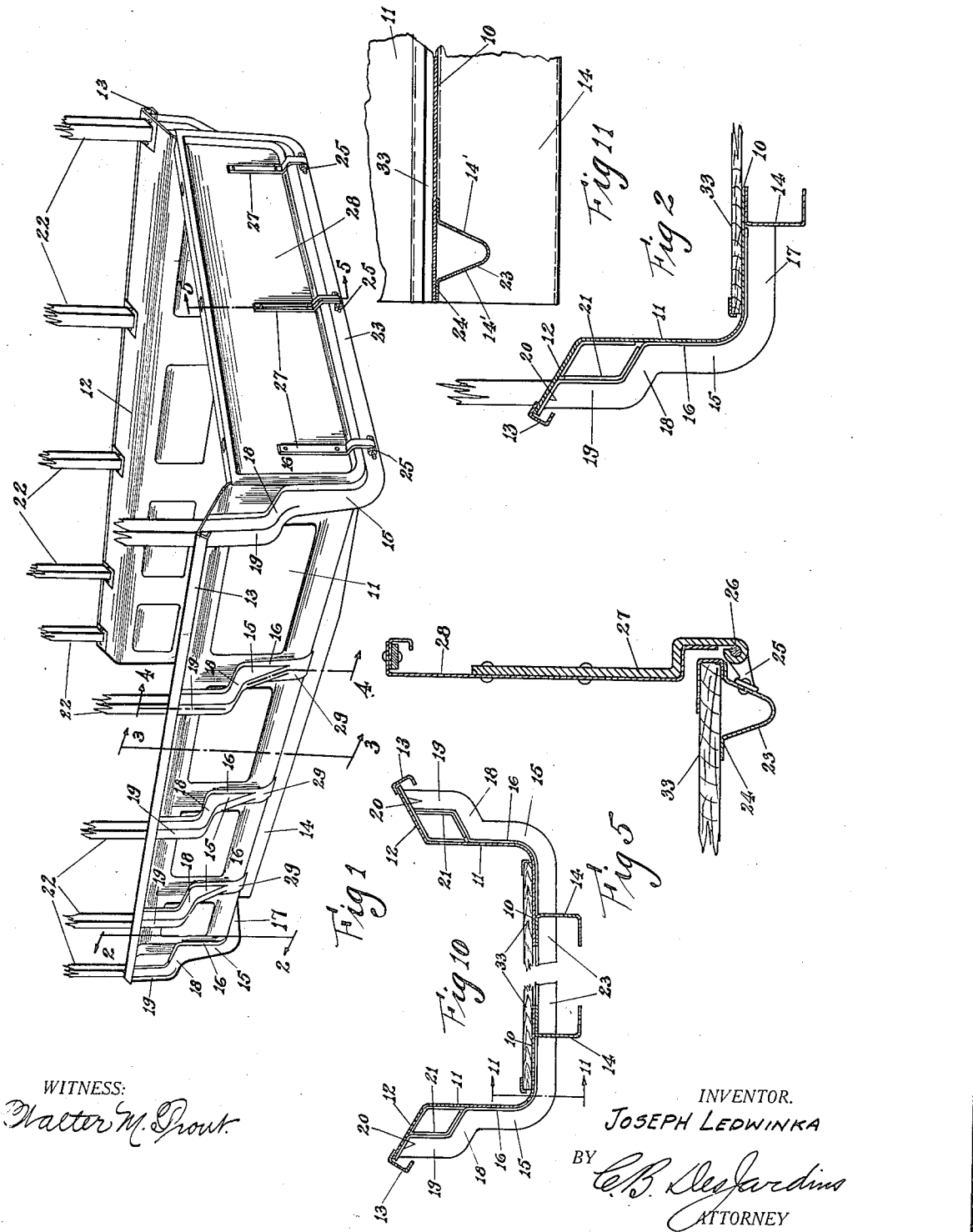

J. LEDWINKA

TRUCK BODY

Filed June 10, 1921

WITNESS:
Walter M. Trout

INVENTOR.
JOSEPH LEDWINKA
BY C. B. Desjardins
ATTORNEY.

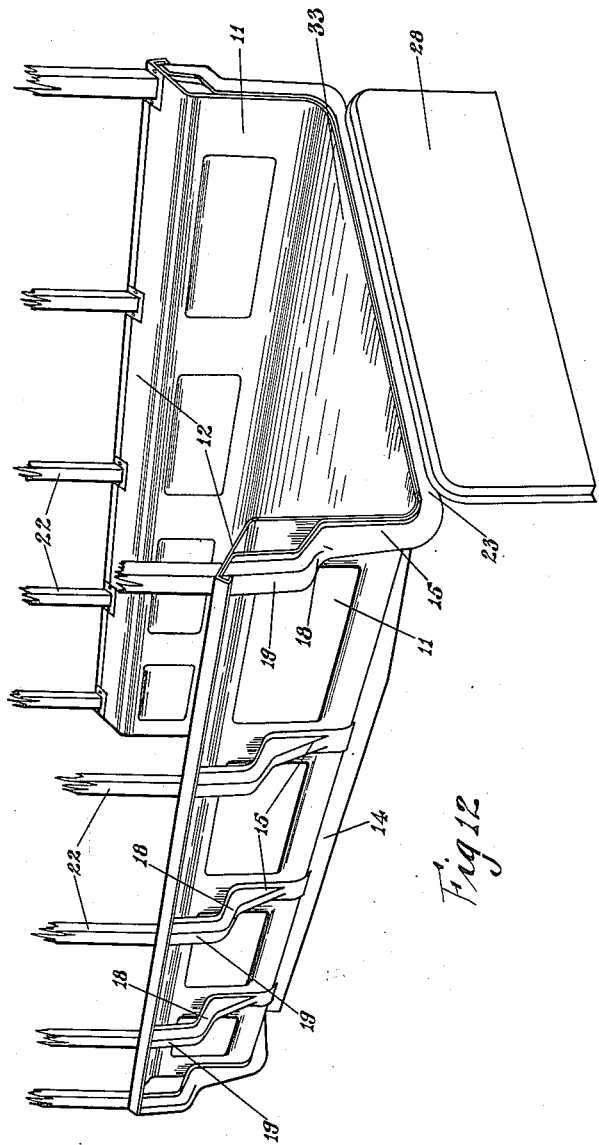

Patented Mar. 6, 1923.

1,447,619

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

TRUCK BODY.

Application filed June 10, 1921. Serial No. 476,413.

*To all whom it may concern:*

Be it known that I, JOSEPH LEDWINKA, a citizen of the United States, residing at Philadelphia, Pennsylvania, have invented certain new and useful Improvements in Truck Bodies, of which I declare the following to be a full, clear, and exact description.

This invention relates to improvements in truck bodies and, more particularly, to truck bodies constructed entirely of sheet metal.

One of the objects of my invention is to provide an improved truck body which will be particularly simple and inexpensive to manufacture and very durable and efficient in use and operation.

Another object of my invention is to provide a truck body having braces or reinforcing members so arranged and constructed that they may also constitute stake sockets thus eliminating the necessity for providing separate members to receive the stakes.

Further objects, and objects relating to economies of material and details of construction will definitely appear from the description to follow. I may accomplish the objects of my invention, in one instance, by the devices and means described in the following specification. My invention is clearly defined and pointed out in the appended claims. A structure constituting a preferred embodiment of my invention is illustrated in the accompanying drawings, forming a part of this specification, in which:

Fig. 1 is a perspective view of a truck body embodying my invention.

Fig. 2 is a detail, sectional view taken on the line 2—2 of Fig. 1 and showing one of the brace members at the front end of the body.

Fig. 5 is a detail sectional view on the line 5—5 of Fig. 1, showing the mounting of the end gate.

Fig. 10 is a sectional view through the front end of the body, showing a slightly modified form of brace member extending across beneath the floor of the body.

Fig. 11 is a vertical, sectional view on the line 11—11 of Fig. 10, and

Fig. 12 is a perspective view of another embodiment of my invention in which the body shell is formed by a single stamping.

Similar reference numerals refer to similar parts in the several views of the drawings, and the sectional views are taken looking in the direction of the arrows at the ends of the section lines.

Figure 9:
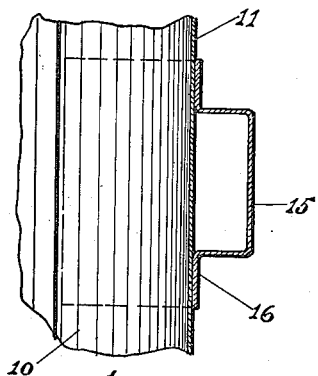
Fig. 9 is an enlarged, sectional view on the line 9—9 of Fig. 4.
Figure 8:
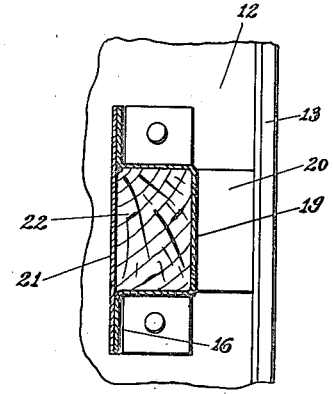
Fig. 8 is an enlarged, sectional view on the line 8—8 of Fig. 4.
Figure 3:
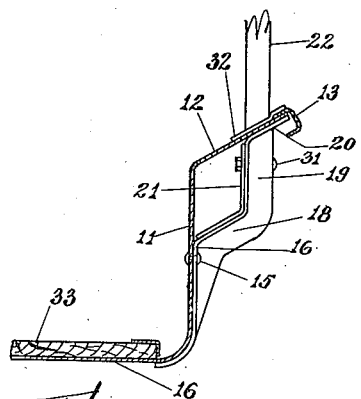
Fig. 3 is a detail, sectional view taken on the line 3—3 of Fig. 1 and showing one of the brace members in the intermediate part of the body.

In general, I accomplish the objects of my invention by providing a truck body the sides of which are formed from steel panels reinforced by brace members or reinforcing ribs applied transversely to said side panels. These steel side panels may be separately formed and rigidly mounted on the body frame to form the body shell, or the shell may be constituted by a single stamping, the vertical side portions of which form the side panels. Whenever, in the specification or claims, I refer to the side panels, it is to be understood that I mean the side portions of the body shell, whether of separate stampings or of a single stamping. The upper ends of the brace members or ribs are so fashioned and arranged with reference to the upper portions of the side panels, that they act as stake sockets and are adapted to receive the lower ends of the truck body stakes. These brace members may run down to the sills of the body frame, or they may terminate at the lower edge of the vertical portions of the side panels, or, in some cases, they may continue across beneath the truck body from one side panel to the other. I find it very desirable to make these brace members of channel shape in cross section, as that makes a very strong reinforcing member and also provides the requisite shape to receive the stake. In many of these truck bodies, the upper portions of the side panels are flared outwardly and the stakes are inserted near the outer edges of these outwardly flaring portions. In such cases, I may form the brace members with vertically extending portions applied to the exterior of the vertical portions of the side panels and with offset upper portions which extend vertically in line with the stakes up to the outwardly flaring portion of the side panel to which the upper ends may be connected. I find it to be a good plan to provide a bracing rib at the rear end of the body which extends across beneath the truck body from one side to the other and on which the hinge brackets for the end gate may be mounted.

I have illustrated, in the drawings, a truck body which constitutes one embodiment of my invention. Referring to these drawings, I have shown a truck body having a body framework made up of the two channel-shaped body sills, 14, connected by various cross members, (not shown). The body shell is formed by two side panels, constituting the sides of the body, each of which has a horizontally extending portion, 10, positioned above and rigidly secured to the corresponding body sill, 14, a vertically extending portion, 11, and an upper, outwardly flaring portion, 12. A channel member, 13, is fastened, by welding, or otherwise, to the upper edge of the part, 12, in order to provide a smooth finish at the upper edge of the body.

The body is reinforced by a series of bracing ribs, 15, which as shown, are channel-shaped in cross section and have marginal flanges, 16, positioned against and secured by welding or otherwise to the portions, 11 and 10, of the side panel. The bracing ribs at the forward end of the body have the channel-shaped portions continued at 17, in a horizontal direction, up to the adjacent body sills, 14, to which they may be connected. The upper ends of these bracing ribs are offset at 18, and terminate in the vertically extending portions, 19, which have laterally extending flanges, 20, at their upper ends, lying against the under surface of the outwardly flaring portions, 12, of the side panel and rigidly secured thereto by welding, riveting, or in any other suitable manner. Openings are formed in the flaring portions, 12, of the side panels, in line with the upper ends, 19, of these bracing ribs. A plate, 21, is secured to the flanges, 16, of the offset portion, 18, and vertical portion, 19, of each bracing rib, so as to form a box or socket to receive the lower end of the stake, 22, which may be inserted through the opening formed in the part, 12, of the side panel.

At the rear end of the body, instead of providing separate bracing ribs at each side, I provide a transverse bracing rib, 23, which is channel-shaped in cross section, the upper ends of which are turned upwardly and applied to the side panels in the same manner as the bracing ribs which I have just described. This transverse bracing rib, 23, extends from one side of the body to the other and supports the rear ends of the floor boards, 33. The hinge brackets, 25, are mounted on this transverse bracing rib, 23, and carry the pintles, 26, of the hinges, 27, secured to and carried by the end gate, 28.

In the case of the bracing ribs between the front and rear ends of the body, I find it desirable to fashion these members so that they change gradually from the channel cross section to a flat portion, 29, which is curved, applied to and rigidly secured to the curved portion of the side panel between the horizontal part, 10, and the vertical part, 11.

I may use, in some cases, transverse bracing ribs, 23, such as shown in Figs. 1, 10 and 11, having the upturned ends, 15, and offset portions, 19, which receive the stakes. When I use such transverse members, I sometimes find it desirable to notch the body frame sills, 14, as at 14'. The transverse bracing rib, 23, seats in these notches and may be welded to the sills.

Figure 4:
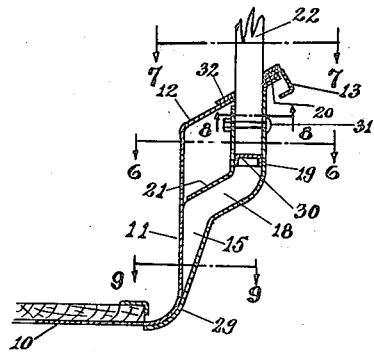
Fig. 4 is a detail, sectional view on the line 4—4 of Fig. 1.
Figure 6:
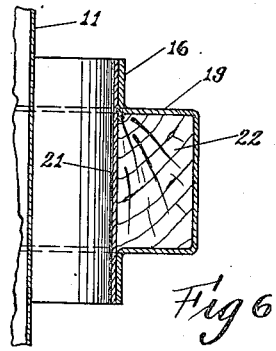
Fig. 6 is an enlarged, sectional view on the line 6—6 of Fig. 4.
Figure 7:
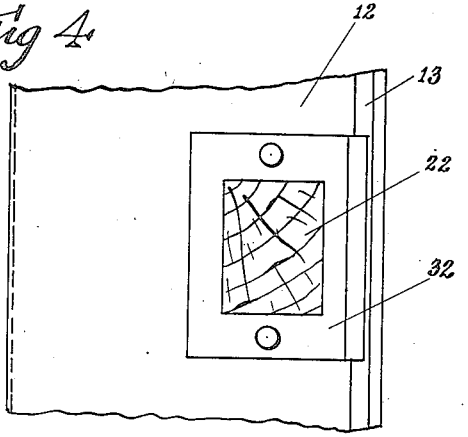
Fig. 7 is an enlarged, sectional view on the line 7—7 of Fig. 4.

I may secure in place within the upper, vertical portion, 19, of the bracing rib, a block, 30, on which the lower end of the stake will rest. The stake may be secured in place by a bolt, 31, extending through the parts, 19 and 21, as shown in Fig. 4. A plate, 32, provided with a central opening for the stake, 22, may be applied to the part, 12, of the side panel, as shown in Fig. 7, being secured thereto by riveting or welding, so as to reinforce the panel at this point and give it a neater appearance.

Instead of making the body shell by rigidly mounting separate stampings, forming the sides of the body, on the body framework, I may make the body shell of a single stamping which is rigidly mounted on the body sills. This construction is shown in Fig. 12. The body shell is formed of a single stamping having a horizontal, floor portion, 33, the vertical side panels, 11, and the upper, outwardly-flaring portions, 12. The body shell is mounted on the sills, 14, of the body framework. Bracing ribs are applied to and reinforce the body shell just as in the construction previously described. The bracing ribs, 15, are rigidly secured to the side panels, 11, and have their upper ends offset, at 18, and terminating in the vertical portions, 19, forming stake sockets.

The transverse bracing rib, 23, also extends beneath the horizontal, floor portion, 33, and has its upturned ends applied to the side panels, 11.

From the foregoing description, it will be observed that I have provided a series of bracing ribs applied to the outer side surfaces of the side panels in such a way as to brace and reinforce the body shell, and, at the same time, provide vertically extending sockets in which the lower ends of the stakes may be received and secured. These stakes may either be relatively short, for use when a load is to be piled up on the truck body, or they may be longer and support the roof of the body, as in the case of a body of the delivery type. By offsetting the upper ends of the bracing ribs I not only provide vertically extending sockets to receive the lower ends of the stakes, but also provide a much more efficient reinforcement for the body shell. The portions, 18, of the bracing ribs act as struts to resist the leverage upon the lower end of the stakes caused, for example, by the swaying back and forth of the roof as the vehicle moves over the road. The portions, 19, act as columns providing a vertical support for the outer edges of the outwardly-flaring portions, 12, of the side panels. This gives an efficient support to that part of the body shell on which strains frequently come as, for example, in loading the body when heavy weights come to rest on the channel-members, 13. This bracing rib construction, therefore, makes a stronger body and one that is more economical to manufacture since it is not necessary to provide separate sockets for the stakes, which are received in the upper ends of the bracing ribs. The space between the upper portions of the side panels and the offset portions of the bracing ribs may also be utilized for the storage and carriage of various articles as, for example, the stakes, 22, when they are not erected and in use.

I am aware that the embodiment of my invention, which I have illustrated here, may be changed in a number of particulars without departing from the spirit of my invention, and, therefore, I am not to be restricted to the details of construction illustrated and claim my invention broadly, as indicated by the appended claims.

Having thus described my invention, what I claim as new and desire to secure by Letters Patent is:

1. In a truck body, the combination with a body shell including side panels having vertical portions and outwardly-flaring, upper portions, of a plurality of bracing ribs transversely applied externally to and rigidly secured to vertical portions of said panels, and having vertically-extending portions terminating near the outer edges of the upper portions of said side panels, said vertically-extending portions forming sockets adapted to receive the body stakes.

2. In a truck body, the combination with a body shell including side panels having vertical portions and outwardly-flaring, upper portions, of a plurality of bracing ribs applied externally to and rigidly secured to the vertical side portions of said panels, the upper ends of said bracing ribs being offset and terminating in vertical portions extending near the outer edges of the upper portions of said side panels, said vertical portions forming sockets adapted to receive the lower ends of body stakes.

3. In a truck body, the combination of a body shell including side panels having vertical side portions and upper, outwardly-flaring portions, the latter having a plurality of openings formed therein near the outer edges thereof, a plurality of bracing ribs applied to and rigidly secured to said side panels, and having upper, vertical portions secured to the outwardly flaring portions of said side panels in line with said openings, and a plurality of stakes having their lower ends extending through said openings and seated in the upper ends of said brace members.

4. In a truck body, the combination of a body shell including side panels having vertical side portions and upper, outwardly-flaring portions, a plurality of channel-shaped bracing ribs, the lower portions of which are applied to and rigidly secured to the vertical portions of said side panels, and the upper portions of which are offset and terminate in vertically-extending portions ending near the outer edges of the upper portions of said side panels, and plates fastened to the offset, upper portions of said brace members and closing the open sides thereof, forming vertically extending sockets adapted to receive the lower ends of body stakes.

5. In a truck body, the combination of a body shell including side panels having vertical side portions and upper, outwardly-flaring portions, the latter being provided with a plurality of openings near the outer edges thereof, a plurality of bracing ribs, channel-shaped in cross section, applied externally to and rigidly secured to the vertical portions of said side panels, the upper portions of said brace members being offset and terminating in vertical portions, the upper ends of which are rigidly secured to the outwardly flaring portions of said side panels in line with said openings therein, and plates secured to said brace members and closing the open sides thereof to form sockets to receive the lower ends of the body stakes.

6. In a truck body, the combination with a body shell including sheet metal side panels having lower horizontal portions and vertical side portions, of a channel-shaped, sheet metal bracing rib applied externally to and rigidly secured to the side portion of one of said panels, the lower portion of said bracing rib being formed into a curved plate applied and rigidly secured to the lower portion of the side panel, the upper portion of said bracing rib forming a socket adapted to receive the lower end of a body stake.

7. In a truck body, the combination with a body shell including side panels provided with lower horizontal portions, intermediate vertical portions and upper, outwardly-flaring portions, of a channel-shaped bracing rib applied externally to and rigidly secured to the intermediate vertical portion of one of said panels, and having its lower end formed into a curved plate applied and rigidly secured to the lower portion of said side panel, and its upper end offset and extending vertically to the outer edge of the upper portion of said side panel, said offset upper end forming a socket adapted to receive a body stake.

8. In a truck body, the combination of a body shell including a side panel, a channel-shaped bracing rib rigidly secured to said side panel and having a vertically extending upper end terminating near the upper edge of said side panel, a spacing block secured within the upper portion of said channel-shaped rib, and a stake having its lower end received in the upper end of said bracing rib and resting on said block.

9. In a truck body, the combination of a framework including a pair of longitudinally extending body sills, a body shell including side panels, having lower horizontally extending portions positioned above and secured to said sills and vertical side portions, and a bracing rib, having a portion extending horizontally beneath the horizontal portion of one of said side panels and connected to one of said sills and a vertically-extending portion rigidly secured to the vertical portion of the side panel, the upper end of said bracing rib being adapted to receive the lower end of a body stake.

10. In a truck body, the combination of a framework including a pair of longitudinally extending body sills, a body shell including side panels, having lower horizontal portions secured to said body sills, intermediate vertical portions and upper, outwardly-flaring portions, and a channel-shaped bracing rib having its inner end disposed beneath the horizontal portion of one of the side panels and connected to one of the body sills and having a vertical portion secured to the vertical portion of the side panel and an upper offset end extending vertically and terminating near the outer edge of the upper portion of the side panel, said upper offset end of the bracing rib being adapted to receive a body stake.

11. In a truck body, the combination of a body shell including side panels having vertical side portions, and a transverse bracing rib extending beneath the body shell from side to side and having its ends extending upwardly and applied to and rigidly secured to the vertical portions of said side panels, the ends of said transverse bracing rib being adapted to receive the lower ends of body stakes.

12. In a truck body, the combination of a body shell including side panels having vertical side portions and upper, outwardly-flaring portions, and a transverse bracing rib extending beneath said body shell and having upwardly-turned portions applied externally to and rigidly secured to the vertical portions of said side panels, the ends of said upwardly-turned portions being offset and terminating in vertical portions extending to points near the outer edges of said side panels, said vertical portions forming sockets adapted to receive the lower ends of body stakes.

13. In a truck body, the combination with a body shell including side panels having vertical side portions, of a transverse bracing rib extending beneath the body shell and having its ends turned upwardly and rigidly secured to the side panels, the upper ends of said transverse bracing rib being adapted to receive the lower ends of body stakes, and an end gate for said body hinged to said transverse bracing rib.

14. In a truck body, the combination with a body shell including side panels having vertical side portions and upper, outwardly-flaring portions, of bracing ribs having lower, vertical portions applied externally and rigidly secured to the vertical portions of the side panels, upper vertical portions having their upper ends rigidly secured to the outer edges of the outwardly-flaring portions of the side panels, and intermediate portions connecting the vertical portions of the bracing ribs and extending substantially parallel to the outwardly-flaring portions of the side panels.

15. In a truck body, the combination with a body shell including side panels having vertical portions and outwardly-flaring upper portions, of a plurality of bracing ribs transversely applied externally to and rigidly secured to vertical portions of said panels, and having vertically-extending portions terminating near the upper edge of the body, said vertically-extending portions forming sockets adapted to receive the body stakes.

16. In a truck body, the combination of a body shell including side panels having vertical side portions and upper, outwardly-flaring portions, the latter having a plurality of openings formed therein, a plurality of bracing ribs applied to and rigidly secured to said side panels and having upper vertical portions secured to the outwardly-flaring portions of said side panels in line with said openings, and a plurality of stakes having their lower ends extending through said openings and seated in the upper ends of said brace members.

17. In a truck body, the combination of a body shell including side panels having vertical side portions and upper, outwardly-flaring portions, and a transverse bracing rib extending beneath said body shell and having vertically-extending, bracing rib portions applied externally and rigidly secured to the vertical portions of said side panels, the ends of said vertically-extending portions terminating at points near the outwardly-flaring portions of said side panels, said portions being adapted to receive the lower ends of body stakes.

18. In a truck body, the combination with a body shell including side panels having vertical side portions and upper, outwardly-flaring portions, of a transverse bracing rib extending beneath the body shell and having vertical, bracing rib portions rigidly secured to the side panels, the upper ends of said vertical, bracing rib portions being adapted to receive the lower ends of body stakes passing through said outwardly-flaring portions of the side panels, and an end gate for said body hinged to said transverse bracing rib.

19. In a truck body, the combination of a side panel having a vertical portion and an upper, outwardly-flaring portion, and a bracing rib rigidly secured to and reinforcing the vertical portion of the side panel and connected to form a support for the outwardly-flaring portion, the upper end of said bracing rib forming a socket adapted to receive a body stake.

20. In a truck body, the combination of a side panel having a vertical portion and an upper, outwardly-flaring portion, the latter having a stake opening therein, and a bracing rib rigidly secured to and reinforcing the vertical portion of said side panel and connected to form a support for said outwardly-flaring portion, the upper end of said bracing rib forming a socket adapted to receive a body stake passing through said stake opening.

21. In a truck body, the combination of a side panel having a vertical portion and an upper, outwardly-flaring portion, the latter having a stake opening therein, and a bracing rib rigidly secured to and reinforcing the vertical portion of said side panel and having its upper end rigidly secured to said outwardly-flaring portion at the stake opening, whereby said rib forms a support for said outwardly-flaring portion, the upper end of said rib forming a socket adapted to receive a body stake passing through said stake opening.

22. In a truck body, the combination of a side panel having a vertical portion and an upper, outwardly-flaring portion, and a bracing rib rigidly secured to and reinforcing the vertical portion of said side panel and having an offset upper portion connected to said outwardly-flaring portion so as to form a supporting column therefor.

23. In a truck body, the combination of a side panel having a vertical portion and an upper, outwardly-flaring portion, the latter having a channel formation at the outer edge thereof to reinforce the same, and a bracing rib rigidly secured to and reinforcing the vertical portion of said side panel and connected to said outwardly-flaring portion so as to form a supporting column therefor.

24. In a truck body, the combination of a side panel having a vertical portion and an upper, outwardly-flaring portion with a stake opening therein, and a bracing rib rigidly secured to and reinforcing the vertical portion of said panel, the upper end of said rib having lateral flanges rigidly secured to the lower side of said outwardly-flaring portion adjacent the stake opening, said rib forming a supporting column for said outwardly-flaring portion and being adapted to receive a body stake passing through said stake opening.

In testimony whereof, I affix my signature.

JOSEPH LEDWINKA.